United States Patent [19]
Saltzman et al.

[11] 3,836,341
[45] Sept. 17, 1974

[54] WEAR RESISTANT COMPOSITE CYLINDER LININGS

[75] Inventors: Gilbert A. Saltzman, Plainfield, N.J.; Tony U. Otani, Pulaski, Va.; Donald P. Lomax, Oconomouoc, Wis.

[73] Assignee: Xaloy Incorporated, New Brunswick, N.J.

[22] Filed: Oct. 10, 1972

[21] Appl. No.: 296,009

Related U.S. Application Data

[63] Continuation-in-part of Ser. No. 197,374, Nov. 10, 1971, abandoned.

[52] U.S. Cl.............. 29/191.6, 29/527.3, 164/114
[51] Int. Cl............................................ B21c 37/06
[58] Field of Search ............. 264/270; 164/114, 98; 197/374

[56] References Cited
UNITED STATES PATENTS

| | | | |
|---|---|---|---|
| 1,431,716 | 10/1922 | Arens.............................. | 264/270 X |
| 1,950,356 | 3/1934 | De Bats............................ | 164/98 X |
| 2,697,043 | 12/1954 | Wade.............................. | 164/114 X |
| 3,049,753 | 8/1962 | Ogden et al........................ | 425/464 |
| 3,258,817 | 7/1966 | Smiley............................. | 29/191.2 X |
| 3,293,029 | 12/1966 | Broderick et al.............. | 29/191.6 X |
| 3,304,604 | 2/1967 | Quaas............................. | 29/527.3 |

*Primary Examiner*—Winston A. Douglas
*Assistant Examiner*—O. F. Crutchfield
*Attorney, Agent, or Firm*—Hubbell, Cohen & Stiefel

[57] ABSTRACT

A wear- and corrosion-resistant lining material for extruder barrels or injection molding machine cylinders, constituted of a non-ferrous, tungsten carbide-containing alloy material incorporating from 30 to 45% tungsten carbide, 22 to 61% nickel, up to 37% cobalt, up to 12% chromium, 1.3 to 3.0% boron, 0.7 to 3.3% silicon, and up to 1.0, 3.3 and 0.6% of manganese, iron and carbon, respectively, all percentages being given by weight. The lining is centrifugally cast with the tungsten carbide particles dispersed differentially across a substantial proportion of the thickness thereof.

6 Claims, 2 Drawing Figures

WEAR RESISTANT COMPOSITE CYLINDER LININGS

CROSS REFERENCE TO RELATED APPLICATION

This application is a continuation-in-part of pending application Ser. No. 197,374, filed Nov. 10, 1971 and now abandoned.

BACKGROUND OF THE INVENTION

This invention relates to wear-resistant, corrosion-resistant non-ferrous alloy linings for extrusion and injection molding machine cylinders. More particularly, the invention pertains to such a composite cylinder bore lining, comprising tungsten carbide particles dispersed in a non-ferrous nickel- or cobalt-rich alloy matrix.

As used herein, "ferrous" or "high ferrous" content alloys are those alloy materials containing in excess of about 85% by weight iron; on the other hand, the term "non-ferrous" alloys is intended to refer to those compositions incorporating less than about 25% by weight iron content.

In the past, extruder barrels and injection molding machine cylinders have frequently been cast with high-ferrous content alloy linings. These prior ferrous alloy linings typically have ambient temperature hardnesses in the range of 58–64 Rockwell C in their centrifugally cast state. While such high ferrous content linings demonstrate excellent wear resistance to abrasive fillers present in plastic compositions during extrusion or molding operations, some such linings have relatively poor corrosion-resistant qualities, especially under conditions which cause the plastic material being processed to partially decompose.

The use of high-ferrous content alloy linings has, therefore, been principally directed to non-corrosive applications. On the other hand, non-ferrous alloys which exhibit satisfactory corrosion resistance, are not as wear- and abrasion-resistant as the high ferrous content alloy linings.

It is, therefore, among the objects of the present invention to provide wear- and corrosion-resistant linings for extruder and injection molding cylinder bores, which exhibit the wear and abrasion resistance of high-ferrous content alloy linings and the anti-corrosive properties of non-ferrous alloy linings. A further object of this invention is to provide such linings incorporating tungsten carbide particles so distributed through the alloy matrix as to impart the desirable characteristics of tungsten carbide thereto without impairing continuity of the lining or preventing conventional finishing thereof.

Other objects and advantages of the invention will be apparent from the following description of preferred embodiments thereof. In the description, and in the claims appended hereto, all parts and percentages are given by weight and all temperatures are in degrees Fahrenheit unless otherwise specified.

SUMMARY OF THE INVENTION

According to this invention, wear- and corrosion-resistant linings for the cylinder bores of extruders or injection molding equipment are provided by the centrifugal casting of a composite, non-ferrous tungsten carbide-containing alloy material comprising the following ingredients fused together in approximately the proportions set forth below:

| Ingredient | Weight Percent |
| --- | --- |
| Tungsten Carbide | 30–45 |
| Nickel | 22–61 |
| Cobalt | up to 37 |
| Chromium | up to 12 |
| Boron | 1.3–3.0 |
| Silicon | 0.7–3.3 |
| Iron | up to 3.3 |
| Manganese | up to 1.0 |
| Carbon | up to 0.6 |

The non-ferrous composite alloy linings provided by centrifugal casting of the noted compositions possess hardness characteristics of from 48–64 Rockwell C, which encompasses the range usually found in conventional high-ferrous content alloys.

It has previously been proposed to incorporate tungsten carbide refractory particles in alloy matrices, e.g., in U.S. Pat. Nos. 3,215,510; 3,304,604; 3,451,791; 3,512,962; and 3,567,408. Alloys of such type have not, however, previously been used for the bores of extruder barrels or injection molding machine cylinders, nor have the advantages of the centrifugally cast linings of such materials previously been disclosed or suggested.

The tungsten carbide particles are dispersed in differential concentrations across the thickness of the alloy linings hereof by the centrifugal casting thereof, the relative amount of tungsten carbide being greater in the lining strata adjacent the substrate therefor (i.e., the steel extruder barrel or injection molding machine cylinder) than in the strata remote therefrom. In accordance with a further feature of the invention, it has been found desirable to so regulate the alloy content and the parameters of the centrifugal casting operation to distribute the tungsten carbide across a substantial portion but not the entire cross-section of the lining as cast, and preferably across from about 45 to 80% by volume of the lining. In this manner excess and uneconomical machining of the cast lining, as would be necessary when the desired tungsten carbide is distributed through only a minor portion of the lining cross-section, is avoided. On the other hand, distribution of the tungsten carbide particles across substantially the entire cast lining makes machining exceedingly difficult or, alternatively, necessitates the use of smaller than normal finishing allowances and may result in the formation of finished linings having surface irregularities. Thus, by distributing the tungsten carbide particles across a substantial but not the entire cross-section of the cast lining, honing, grinding or other machining operations resulting in the formation of smooth internal lining surfaces are facilitated.

PREFERRED EMBODIMENTS OF THE INVENTION

Figure 2:
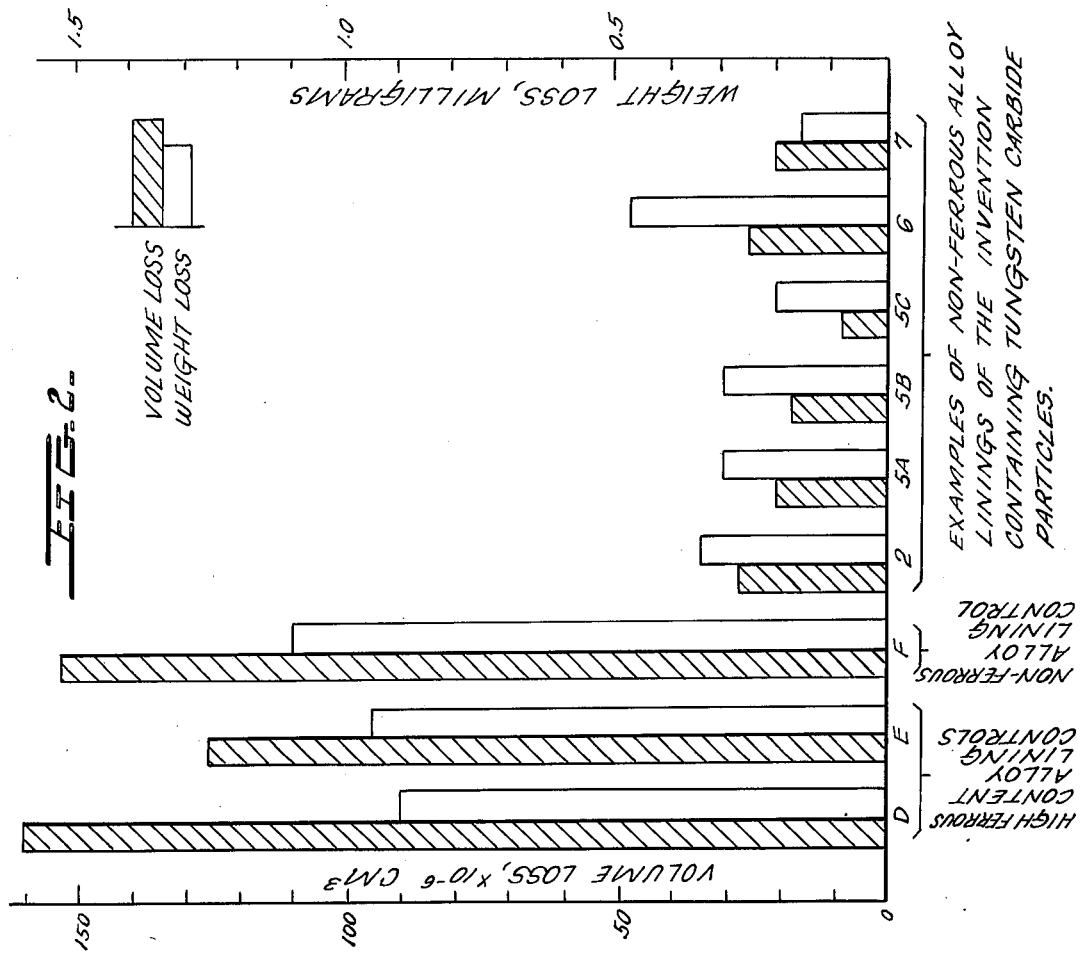
FIG. 2 is a graph comparing the wear resistance of various composite lining materials of the present invention, as compared with several previously known high-ferrous content or non-ferrous alloy linings.

The non-ferrous tungsten carbide-containing composite alloy materials utilized in accordance with this invention incorporate substantial proportions of tungsten carbide particles dispersed in nickel- or cobalt-rich alloy matrices. Desirably, relatively fine tungsten carbide particles are so employed, suitably of 100 mesh or, preferably, 200 mesh or finer sizes. In the preparation of linings for particular applications, the tungsten carbide particles dispersed throughout the alloy matrix may be as small as 325 mesh or finer.

The tungsten carbide particles are dispersed in the alloy matrix by centrifugal casting thereof as described more fully below, the resulting cylinder lining being prepared by fusing of the respective ingredients noted hereinabove. Preferred lining materials may be prepared by dispersing the tungsten carbide particles in nickel-rich or cobalt-rich matrices. The mixture thus prepared for casting may be of the following types:

| Ingredient | Nickel-Rich Mixture I (wt. %) | Nickel-Rich Mixture II (wt. %) | Cobalt-Rich Mixture (wt. %) |
| --- | --- | --- | --- |
| Tungsten Carbide | 30–45 | 34–45 | 30–35 |
| Nickel | 45–61 | 39–52 | 22–28 |
| Cobalt | 4–6 | 5–6 | 29–37 |
| Chromium | — | 3–5 | 3.5–5.5 |
| Boron | 1.3–2.3 | 1.3–2.3 | 1.9–2.7 |
| Silicon | 2.0–3.3 | 2.0–3.0 | 0.7–1.0 |
| Iron | up to 2.0 | up to 2.5 | up to 2.0 |
| Carbon | — | up to 0.08 | up to 0.2 |
| Manganese | — | — | up to 1.0 |

When the materials for forming the linings are as specified hereinabove, continuous linings incorporating the tungsten carbide particles dispersed differentially therethrough are obtained. When, on the other hand, the constituents of the alloy matrices are not utilized in the noted proportions continuous cast linings may not be formed. Thus, when the tungsten carbide content is too high for the particular matrix alloy forming the composite lining therewith, the matrix material cannot melt and flow properly and an irregular, lumpy, porous lining is formed. Such a discontinuous lining was produced, for example, in Control B described below. It is thus important to maintain the composite alloy compositions within the proportions set forth hereinabove in order to insure the formation of the continuous composite cast linings of the present invention.

The cylinder linings may suitably be prepared by centrifugal casting in the manner described, for example, in U.S. Pat. Nos. 3,334,996; 3,352,666; and 3,658,515 and the prior patents referred to therein. For example, the materials for forming the alloy lining may be initially charged into the interior bore of an extruder barrel or injection molding machine cylinder. Such materials may comprise separate matrix alloy and tungsten carbide powders, or a composite alloy material which has been previously sintered or fused and charged into the tubular housing in shot or sintered and crushed form. After the ends of the cylindrical steel housing of the extruder barrel or injection molding machine cylinder are capped to enclose the charge and prevent atmospheric oxidation, the unit is placed in a furnace and heated at temperatures of from about 2,000° to 2,300° F to melt the matrix component.

After the sealed tube is heated above the melting point of the matrix component for up to about 2 hours, the assembly may be removed from the furnace and spun to centrifugally form the alloy lining. As the housing cools the metal solidifies and bonds metallurgically to the steel housing. Thereafter, the caps may be removed from the ends of the housing and the desired cylinder diameter(s) finished, e.g., honed, in the customary manner.

In view of the greater density of the tungsten carbide particles, the centrifugal casting forming operation distributes such particles in differential concentrations across the thickness of the composite lining, the relative amount of the tungsten carbide being greater in the lining strata adjacent the steel housing than adjacent the outer surface of the lining. Moreover, by suitably regulating the proportions of the respective ingredients in the composite alloy material and the temperature and speed of rotation during centrifugal casting, the tungsten carbide may be dispersed across any predetermined portion of the lining cross-section. In this manner, some of the tungsten carbide particles may remain at the outer surface of the lining or, alternatively, the refractory material may only be dispersed across interior strata thereof.

Finishing of extruder barrel or injection molding machine cylinder linings involves a machining operation in which the lining surface is honed or ground to remove surface irregularities and imperfections and thus meet the desired thickness and smoothness specifications therefor. Tungsten carbide-containing strata cannot, however, be readily machined employing conventional operations. Accordingly, it has been found desirable to control the tungsten carbide content of the cast lining whereby to facilitate the desired machining and finishing thereof.

It has been found desirable, in accordance herewith, to disperse the tungsten carbide particles across at least about 45% by volume of the composite cylinder linings. Linings in which the tungsten carbide is dispersed across smaller portions thereof must be cast in substantially greater thicknesses to facilitate finishing to specified tungsten carbide layer thicknesses, e.g., one-sixteenth inch. Such is economically undesirable since the excess tungsten carbide-free layer cast (the honing stock) requires appreciable additional honing for removal and results in a significantly greater quantity of metal loss (see Controls A and C below).

On the other hand, cast linings in which the tungsten carbide particles are dispersed across more than about 80% by volume thereof are exceedingly difficult to hone if standard honing allowances are utilized. Alternatively, a significantly smaller honing allowance may be utilized, or honing of the cast lining may be eliminated. Although the faces of linings thus formed contain surface irregularities, they may suffice for some applications (see, for example, Examples 2 and 5A through 5C below).

Figure 1:
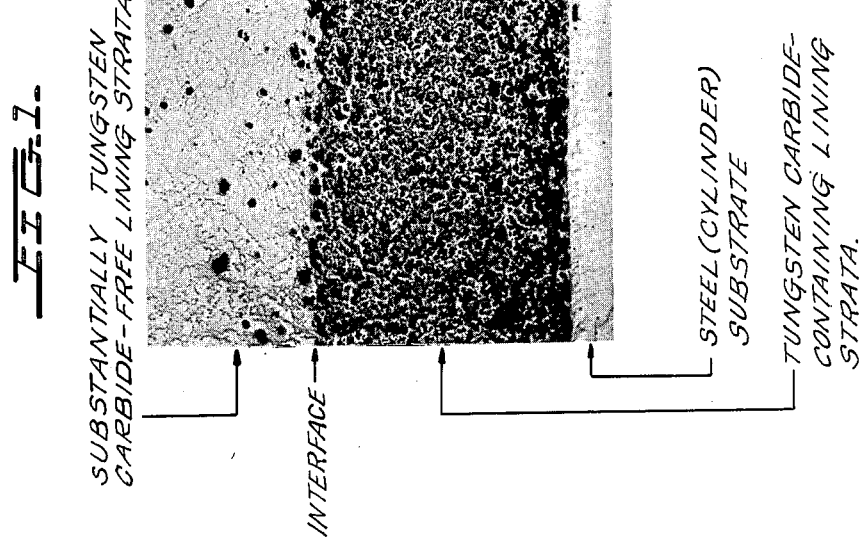
FIG. 1 is a photomicrograph of a cross-section of a composite cast lining of the present invention.

In FIG. 1 of the drawing, a photomicrograph of a typical composite lining of the invention is shown, viewed at 50x magnification. The interface of the tungsten carbide-containing strata and the substantially tungsten carbide-free layers is readily apparent by visual inspection and is generally marked by at least a 10-fold density gradation. In the lining cross-section illustrated the tungsten carbide-containing strata were about 0.0385 inch thick, the substantially tungsten carbide-free strata about 0.047 inch thick, and the tungsten carbide particles were thus dispersed across approximately 45% by volume of the sample lining.

EXAMPLES

Lining materials were prepared with varying tungsten carbide particle contents and powder sizes; the tungsten carbide was dispersed in different nickel-rich or cobalt-rich alloy matrices, for comparison of the physical properties of the respective linings made therewith. The compositions of the various composite test alloy compositions utilized, identified in Examples 1 to 7 and Controls A to C, are set forth in Table I below:

TABLE I

Compositions of Low Ferrous Content Tungsten Carbide-Containing Test Alloys

| Example | WC[1] | Ni | Co | Cr | B | Si | Fe | Mn | C[2] |
|---|---|---|---|---|---|---|---|---|---|
| 1 | 31 | 27 | 33 | 4.6 | 2.3 | 1 | 1 | <1 | .2 |
| 2 | 35 | 25 | 31 | 4.2 | 2.1 | .9 | .9 | <1 | .2 |
| 3 | 31 | 59 | 4 | — | 2 | 2.9 | 1 | 1 | — |
| 4 | 35 | 55 | 5 | — | 1.8 | 2.7 | .9 | — | — |
| 5A,5B,5C | 44 | 46 | 6 | — | 1.5 | 2.2 | .8 | — | — |
| 6 | 35 | 49 | 5 | 4.2 | 1.8 | 3 | 1.8 | — | .08 |
| 7 | 35 | 46 | — | 11 | 2.5 | 2.5 | 2.5 | — | .6 |
| Control | | | | | | | | | |
| A | 22 | 31 | 36 | 5.3 | 2.6 | 1.1 | 1.1 | <1 | .2 |
| B | 44 | 21 | 28 | 3.5 | 1.7 | .8 | .7 | <1 | .2 |
| C | 26 | 19 | 32 | 12.5 | 2 | 2.5 | 2 | — | .1 |

[1] Example 5A was prepared employing tungsten carbide powders between −100 and +200 mesh; the linings of Examples 2, 3 and 5C, and Controls A and B, were prepared employing tungsten carbide powders between −200 and +325 mesh; and the lining materials of Examples 4 and 5B were prepared employing tungsten carbide powders which passed −325 mesh.
[2] All percentages indicated are maximum percentages with the sole exception of that of the alloy composition of Control C.

The noted compositions, which exhibited satisfactory melt and tungsten carbide solubility characteristics, were charged to low alloy steel cylinders, and centrifugally cast in accordance with conventional procedures to produce cylinder bore linings which could be reduced to one-sixteenth inch final thickness after honing. The spinning temperatures, volumetric percentages of the respective linings (as cast) which contained tungsten carbide particles, and room temperature hardness characteristics of the cast linings, are set forth in Table II:

The highest hardnesses recorded in Table II were measured near the steel substrate-alloy lining interfaces where the tungsten carbide particles were most concentrated and consisted of the largest percentages of relatively coarse particles. Conversely, the lowest hardnesses were measured near the lining surfaces where the tungsten carbide particles were least concentrated and were composed of finer tungsten carbide particles.

As may also be seen from Table II, the linings formed in Controls A and C incorporated tungsten carbide particles dispersed throughout 40% or less of the lining volumes. Utilization of such lining materials would necessitate the use of undue quantities of material to obtain a lining having a specified tungsten carbide layer thickness, e.g., one-sixteenth inch, and would result in a much thicker cast lining. As indicated hereinabove, such is economically undesirable. On the other hand, the lining samples produced in Example 2 and 5A through 5C incorporate tungsten carbide-containing layers throughout more than 95 volume % of the respective linings. In these instances, honing would be exceedingly difficult if standard honing allowances are used.

From the preceding it may be seen that, preferably, the tungsten carbide be dispersed through from about

TABLE II

Preparation and Characteristics of Cylinder Linings Prepared from Low Ferrous Content, Tungsten Carbide-Containing Test Alloys

| Example | Spinning Temperature (°F) | % of Lining Containing WC | Room Temperature Hardness Range | |
|---|---|---|---|---|
| | | | Rockwell A | Rockwell C |
| 1 | 2130 | 48 | 80.5–81.0 | 59.0–60.0 |
| 2 | 2130 | >95 | 77.5–81.2 | 53.0–60.4 |
| 3 | 2130 | 46 | 75.5–76.0 | 49.0–50.0 |
| 4 | 2130 | 66 | 74.2–75.4 | 47.4–48.8 |
| 5A | 2130 | >95 | 76.7–79.3 | 51.4–56.6 |
| 5B | 2130 | >95 | 76.7–79.3 | 51.4–56.6 |
| 5C | 2175 | >95 | 76.7–79.3 | 51.4–56.6 |
| 6 | 2130 | 45 | 78.3–80.5 | 54.6–59.0 |
| 7 | 2030 | 77 | 80.6–83.5 | 59.2–64.2 |
| Control | | | | |
| A | 2030, 2130, 2230 | 13–16 | 73.7–83.6 | 46.4–64.2 |
| B | 2130 | —* | — | — |
| C | 2130, 2230 | 11–40 | 70.4–81.0 | 39.8–60.0 |

*A continuous cast lining was not produced with this alloy.

45% to 80%, most desirably from about 60% to 80% of the total lining, as cast. The linings having the tungsten carbide distributed across portions of their cross-sections within these ranges (Examples 1, 3, 4, 6 and 7) exhibited suitable hardnesses and yet could be readily honed to satisfactory thicknesses.

I. Wear Tests

Wear tests were conducted on ring samples of various of the above test linings, using a Dow Corning LFW-1 Friction and Wear Testing machine. Test blocks 0.250 inch × 0.615 inch × 0.400 inch high, made from the experimental cylinder ring samples, were comparatively tested against standard SAE 4620 control rings, 1.3775 inch dia. × 0.3437 inch wide, hardened to Rc 58-63. An aqueous solution of soluble oil in distilled water (1:40 parts by volume) was used as a coolant for the system. Test blocks loaded to 300 pounds were run against control rings rotated at 197 rpm for 20,000 revolutions. The amount of wear in each sample tested was measured in terms of weight loss and volume loss.

High ferrous and non-ferrous, tungsten carbide-free samples (Controls D, E and F) were prepared in the same manner as the preceding test samples, and were subjected to the same wear test. The high ferrous content materials (Controls D and E) differed essentially in that Control E contained chromium in an amount of somewhat less than about 1.5% whereas Control D did not contain any chromium. The composition of the non-ferrous control sample (Control F) was similar to the above-noted test samples, save for the omission of tungsten carbide.

The comparative wear test results amongst the various high-ferrous and non-ferrous control samples and the non-ferrous tungsten carbide-containing samples of the invention are illustrated in FIG. 2 of the drawing. In terms of the graphical comparison thereof, the larger the volume and weight losses, the lower the wear resistance of the sample under the test conditions. As shown in the drawing, when volume loss is used as the basis of comparison between the respective samples, the poorest tungsten carbide-containing lining (Example 2) was approximately five times better than the best tungsten carbide-free sample (Control E) while the best tungsten carbide-containing sample (Example 5C) was better than the best tungsten carbide-free sample (Control E) by more than a factor of 15. It is believed that the use of volume loss as a basis of comparison rather than weight loss is justified by the substantial difference in density between the linings with and without tungsten carbide.

II. Corrosion Tests

The corrosion resistance of two of the above test samples (Examples 1 and 4) was compared with that of the nonferrous control sample (Control F) in an acid medium, and shown to be superior. The respective lining samples were exposed for 91 hours in 50% by volume hydrochloric acid at 75° F. The corrosion rates based on weight loss, given in inches penetration per year (ipy), were as follows:

| Test Sample | Corrosion Rate (ipy) |
|---|---|
| Example 4 | 0.044 |
| Example 1 | 0.055 |
| Control F | 0.086 |

It may thus be seen that, in accordance with the present invention, extruder and injection molding device cylinder bores are provided with tungsten carbide-containing composite alloy linings which exhibit superior wear- and corrosion-resistant characteristics, and which may be readily finished in accordance with conventional operations. It will be understood that various changes may be made in the preferred embodiments of such linings described hereinabove without departing from the scope of the invention. Accordingly, the preceding description is intended as illustrative and not in a limiting sense.

What is claimed is:

1. A cylinder for an extruder or an injection molding machine, having a wear- and corrosion-resistant composite non-ferrous, tungsten carbide-containing alloy material lining in which the tungsten carbide is dispersed in differential concentrations across the thickness of the lining, the relative amount of tungsten carbide being greater in the strata adjacent the substrate for the lining than in the strata remote therefrom, and a tungsten carbide density gradient existing between said strata, said lining being prepared by centrifugal casting of the following ingredients fused together in approximately the proportions set forth below:

| Ingredient | Weight Percent |
|---|---|
| Tungsten Carbide | 30–40 |
| Nickel | 22–61 |
| Cobalt | up to 37 |
| Chromium | up to 12 |
| Boron | 1.3–3.0 |
| Silicon | 0.7–3.3 |
| Manganese | up to 1.0 |
| Iron | up to 3.3 |
| Carbon | up to 0.6 |

2. The cylinder of claim 1, wherein the lining incorporates a nickel-rich alloy matrix including cobalt, boron, silicon and iron, and wherein said lining is prepared by centrifugal casting of the following ingredients fused together in approximately the proportions set forth below:

| Ingredients | Weight Percent |
|---|---|
| Tungsten Carbide | 30–45 |
| Nickel | 45–61 |
| Cobalt | 4–6 |
| Boron | 1.3–2.3 |
| Silicon | 2.0–3.3 |
| Iron | up to 2.0 |

3. The cylinder of claim 1, wherein the lining incorporates a nickel-rich alloy matrix including cobalt, chromium, boron, silicon, carbon, and iron, and wherein said lining is prepared by centrifugal casting of the following ingredients fused together in approximately the proportions set forth below:

| Ingredients | Weight Percent |
|---|---|
| Tungsten Carbide | 35–45 |
| Nickel | 39–52 |
| Cobalt | 5–6 |
| Chromium | 3–5 |
| Boron | 1.3–2.3 |
| Silicon | 2.0–3.0 |
| Iron | up to 2.5 |
| Carbon | up to 0.08 |

4. The cylinder of claim 1, wherein the lining incorporates a cobalt-rich matrix with nickel, chromium, boron, silicon, iron, manganese and carbin, and wherein said lining is prepared by centrifugal casting of the following ingredients fused together in approximately the proportions set forth below:

| Ingredient | Weight Percent |
|---|---|
| Tungsten Carbide | 30–35 |
| Nickel | 22–28 |
| Cobalt | 29–37 |
| Chromium | 3.5–5.5 |
| Boron | 1.9–2.7 |
| Silicon | 0.7–1.0 |
| Iron | up to 2.0 |
| Carbon | up to 0.2 |
| Manganese | up to 1.0 |

5. The cylinder of claim 1, wherein the tungsten carbide particles in the lining are at least 100 mesh or finer.

6. The cylinder of claim 1, in which the tungsten carbide is dispersed across from 45 to 80 percent by volume of the lining as cast.

* * * * *

UNITED STATES PATENT OFFICE
CERTIFICATE OF CORRECTION

Patent No. 3,836,341    Dated September 17, 1974

Inventor(s) Gilbert A. Saltzman, Tony U. Otani, Donald P. Lomax

It is certified that error appears in the above-identified patent and that said Letters Patent are hereby corrected as shown below:

Claim 1, second line of table (column 8, line 36),

"30-40" should be - - 30-45 - -

Signed and sealed this 29th day of April 1975.

(SEAL)
Attest:

RUTH C. MASON
Attesting Officer

C. MARSHALL DANN
Commissioner of Patents
and Trademarks